United States Patent [19]

Guidette et al.

[11] Patent Number: 5,227,762
[45] Date of Patent: Jul. 13, 1993

[54] POWER LINE CARRIER CONTROLLED LIGHTING SYSTEM

[75] Inventors: David Guidette, Belden, Miss.; James V. Olson, Indianapolis, Ind.; Robert D. Munson; Willard Garnett, both of Tupelo, Miss.

[73] Assignee: Thomas Industries Inc., Louisville, Ky.

[21] Appl. No.: 604,568

[22] Filed: Oct. 26, 1990

[51] Int. Cl.⁵ .......................................... H04M 11/04
[52] U.S. Cl. ......................... 340/310 R; 340/310 A; 340/538
[58] Field of Search ............... 340/310 R, 310 A, 288, 340/286.11, 286.02, 538; 362/233; 307/116, 110; 315/295

[56] References Cited

U.S. PATENT DOCUMENTS

| | | |
|---|---|---|
| 2,595,993 | 5/1952 | Templeman et al. . |
| 3,122,721 | 2/1964 | Liu et al. . |
| 3,459,961 | 8/1969 | Ravas . |
| 3,670,167 | 6/1972 | Forbes . |
| 3,689,886 | 9/1972 | Durkee . |
| 3,736,445 | 5/1973 | Van Sickle . |
| 3,790,848 | 2/1974 | Lai . |
| 3,818,466 | 6/1974 | Honda . |
| 3,831,059 | 8/1974 | LoNigro . |
| 3,861,792 | 1/1975 | Donati . |
| 3,875,554 | 4/1975 | Booker, Jr. et al. . |
| 3,878,431 | 4/1975 | Petrina . |
| 3,886,352 | 5/1975 | Lai . |
| 3,893,000 | 7/1975 | Guercio . |
| 3,898,383 | 8/1975 | Herbits . |
| 3,901,813 | 8/1975 | Potopinski . |
| 3,903,996 | 9/1975 | Berkovitz et al. . |
| 4,009,387 | 2/1977 | Nuver . |
| 4,016,453 | 4/1977 | Moennig . |
| 4,031,408 | 6/1977 | Holz . |
| 4,032,777 | 6/1977 | McCaleb . |
| 4,047,076 | 9/1977 | McNamara, Jr. . |
| 4,071,805 | 1/1978 | Brock . |
| 4,095,139 | 6/1978 | Symonds et al. . |
| 4,144,478 | 3/1979 | Nuver . |
| 4,170,747 | 10/1979 | Holmes . |
| 4,181,873 | 1/1980 | Nuver . |
| 4,197,485 | 4/1980 | Nuver . |
| 4,225,808 | 9/1980 | Saraceni . |
| 4,300,126 | 11/1981 | Gajjar . |
| 4,367,455 | 1/1983 | Fried . |
| 4,418,333 | 11/1983 | Schwarzbach et al. ........ 340/310 A |
| 4,450,351 | 5/1984 | Fraden . |
| 4,461,977 | 7/1984 | Pierpoint et al. . |
| 4,477,748 | 10/1984 | Grubbs . |
| 4,482,844 | 11/1984 | Schweer et al. . |
| 4,523,128 | 6/1985 | Stamm et al. . |
| 4,523,131 | 6/1985 | Zansky . |
| 4,575,684 | 3/1986 | Stamm . |
| 4,658,241 | 4/1987 | Torre . |

(List continued on next page.)

Primary Examiner—Jin F. Ng
Assistant Examiner—Brent A. Swarthout
Attorney, Agent, or Firm—Hill, Steadman & Simpson

[57] ABSTRACT

A power line carrier controlled lighting system connected to an AC power line. The system has: at least one motion detector for detecting at least one predetermined parameter in a detection zone of the motion detector, the motion detector outputting at least one detect signal in response to the predetermined parameter; at least one transmitter for transmitting during a first predetermined time period a power line carrier signal on the AC power line indicative of the detect signal; at least one receiver receiving the power line carrier signal on the AC power line and outputting at least one control signal indicative of the power line carrier signal during a second predetermined time period, the receiver having an AGC circuit for providing substantial noise immunity so that the receiver reliably recognizes the power line carrier signal; and at least one light in a predetermined area and having at least two different light intensity levels, the light having a switching circuit for switching between the light intensity levels, the switching circuit being activated by the control signal. The power line carrier signal is a digital signal and the AGC circuit determines a logical one/zero reference level relative to noise on the power line.

64 Claims, 9 Drawing Sheets

U.S PATENT DOCUMENTS

| | | |
|---|---|---|
| 4,661,720 | 4/1987 | Cameron, Jr. et al. |
| 4,675,579 | 6/1987 | Hardy et al. |
| 4,691,341 | 9/1987 | Knoble et al. |
| 4,716,343 | 12/1987 | Lindquist |
| 4,744,093 | 5/1988 | Arai et al. |
| 4,746,809 | 5/1988 | Coleman et al. |
| 4,755,792 | 7/1988 | Pezzolo et al. |
| 4,757,213 | 7/1988 | Tigges et al. |
| 4,864,296 | 9/1989 | Trett et al. |
| 4,868,539 | 9/1989 | Foord |
| 4,897,774 | 1/1990 | Bingham et al. ............... 307/110 |
| 4,928,038 | 5/1990 | Nerone |
| 4,931,701 | 6/1990 | Carl |
| 5,031,082 | 7/1991 | Bierend ...................... 340/310 R |

POWER LINE CARRIER CONTROLLED LIGHTING SYSTEM

BACKGROUND OF THE INVENTION

The present invention relates in general to power line carrier control lighting systems, and in particular, to a lighting system which automatically responds to movement in a predetermined area to change a setting intensity level of a lights from a dim setting to a high setting.

Numerous control lighting systems are known in the prior art including power line carrier control systems. Such systems are used in a variety of applications, for example, in office buildings wherein conference rooms are kept dark until an individual enters whereupon the lights are turned on or in merchandising stores wherein as an individual approaches a display area the lights change from a dim background level to a full brightness level to display the merchandise. In particular, lighting systems are known in which modules connected to motions sensors are plugged into a receptacle on the power line in the building and remotely located receivers operate a light source in response to signals received from the transmitters. Many of these power line carrier type systems require that extra wires be used in addition to the power line for conveying signals. Furthermore, power line carrier systems which use only the power line to connect the transmitter and receivers are well known for poor performance especially with the occurrence of noise on the power line. Frequently, erroneous noise signals cause the lights to change from one level to another.

The present invention is an improvement over prior art power line carrier control lighting systems and overcomes a number of drawbacks in the prior art.

SUMMARY OF THE INVENTION

It is an object of the present invention to provide an improved power line carrier control lighting system.

It is another object of the present invention to provide a power line carrier control lighting system which is particularly immune to noise levels on the power line which is utilized.

It is a further object of the present invention to provide a power line carrier control lighting system in which a receiver connected to the power line has means for adjustably changing a logical one/zero reference level.

It is yet another object of the present invention to provide a power line carrier control lighting system in which the transmitter and receivers have power supplies which are capable of operating on a range of different power line voltage levels.

It is a further object of the present invention to provide a protocol format which automatically adjusts the receivers for receiving logical ones and logical zeros.

It is yet another object of the present invention to provide receivers which are capable of acknowledging individual addresses, group addresses and global addresses.

The power line carrier controlled lighting system of the present invention is connected to an AC power line. The system has: at least one motion detector for detecting at least one predetermined parameter in a detection zone of the motion detector, the motion detector outputting at least one detect signal in response to the predetermined parameter; at least one transmitter for transmitting during a first predetermined time period a power line carrier signal on the AC power line indicative of the detect signal; at least one receiver receiving the power line carrier signal on the AC power line and outputting at least one control signal indicative of the power line carrier signal during a second predetermined time period, the receiver having an AGC circuit for providing substantial noise immunity so that the receiver reliably recognizes the power line carrier signal; and at least one light in a predetermined area and having at least two different light intensity levels, the light having a switching circuit for switching between the light intensity levels, the switching circuit being activated by the control signal. The power line carrier signal is a digital signal and the AGC circuit determines a logical one/zero reference level relative to noise on the power line.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

The present invention has general applicability, but is most advantageously utilized in a lighting system having high intensity discharge lamps which are operated between full intensity and a dim level. In very general terms, the lighting system of the present invention is depicted in FIG. 1, wherein a plurality of motion detectors 10, 11, 12 and a plurality of high intensity discharge lamps 14, 16, 18 are connected to a power line 26 via respective transmitters 22 and receivers 24.

It is to be appreciated that an infinite number of configurations and combinations of sensors and lamps are possible with the present invention. Lamps, such as fluorescent lamps could be utilized rather than high intensity discharge lamps and the light levels could be continuously changed from bright to dim settings or between a multiple of predetermined settings. Furthermore, the present invention can be utilized with any type of motion detector or other types of sensors for other applications.

Figure 1:
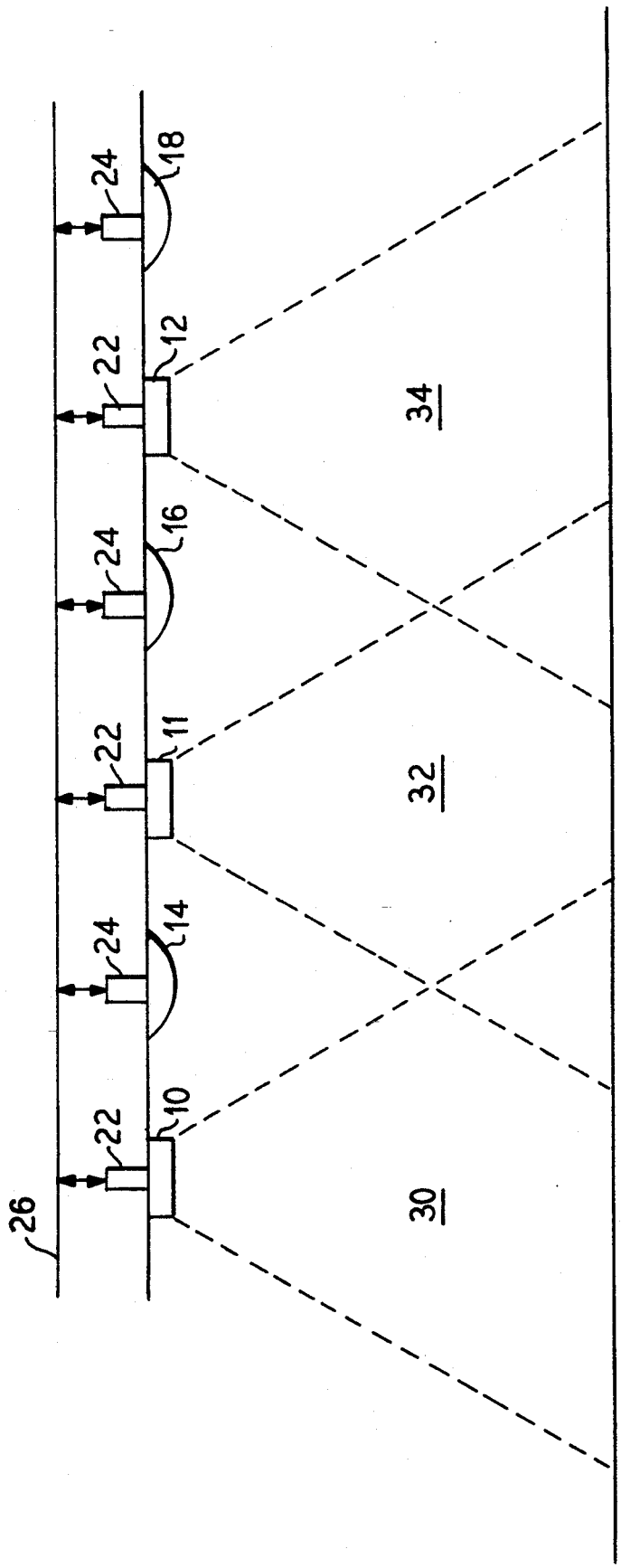
FIG. 1 schematically depicts an arrangement of motion detector and lights used in the power line carrier control lighting system of the present invention.

As depicted in FIG. 1, for example, a person entering the zone of detection 30 of motion sensor 10 causes the respective transmitter 2 connected to the motion sensor 10 to transmit a pulse line carrier signal onto the power line 26. In the preferred embodiment the power line carrier signal contains an address which is recognized by a predetermined receiver, such as receiver 24 connected to lamp 14. Upon receipt of the power line carrier signal the receiver 24 causes lamp 14 to change from a dim level to a bright level, thereby providing ample illumination for a person in zone 30. As the person continues from zone 30 into zone 32 motion sensor 11 detects the presence of the person and via its transmitter 22 addresses receiver 24 of the lamp 16, thereby causing lamp 16 to change its level of brightness from its dim setting to full intensity. Similarly, as the person continues into zone 34 of motion detector 12, the motion detector 12 via its transmitter 22 causes receiver 24 for lamp 18 to increase to full brightness. As the person travels from zone 30 to zone 32 to zone 34 the first lamp 14 will be switched back to its reduced dim state by receiver 24 after a predetermined time interval. Similarly, lamps 16 and 18 are returned to their dim settings after corresponding predetermined time intervals as long as the motion detectors 10, 11 and 12 do not detect any further movement within their respective zones 30, 32 and 34.

It is a feature of the present invention that the transmitters 22 only transmit a power line carrier signal upon activation of the motion detector associated with the transmitter. Although the motion detector may continue to sense movement within its respective zone, the transmitter 22 only transmits one power line carrier signal in a first predetermined time period. If the motion detector 10 still detects movement after the first predetermined time interval, the respective transmitter will then send a second power line carrier signal.

The receiver addressed by the transmitter once it receives a power line carrier signal turns on its respective lamp after which it automatically turns the lamp back to its dim setting automatically after a second predetermined time delay. The receiver will only keep the lamp at full brightness if it receives a second power line carrier signal addressed to it before the end of the second predetermined time interval. For example, the first predetermined time interval can be approximately 4.5 minutes, which is slightly less than the second predetermined time interval of approximately 5 minutes. The purpose of this important feature of the present invention is to reduce the number of power line carrier signals which may occur at any given instant on the power line 26. Thus, with this method of signaling there is a significant reduction in the probability of collision of power line carrier signals and results in a remarkably improved reliability that the correct lamps will stay at full brightness for the correct amount of time. This is especially important, for example, in large warehouses where there may be a great number of motion detectors and high intensity discharge lamps arranged in a matrix type configuration in the ceiling of the warehouse. Obviously, the actual placement of the detectors and lamps is not important to the present invention and any configuration or location of the detectors and lamps is encompassed by the power line carrier lighting system of the present invention.

Figure 2:
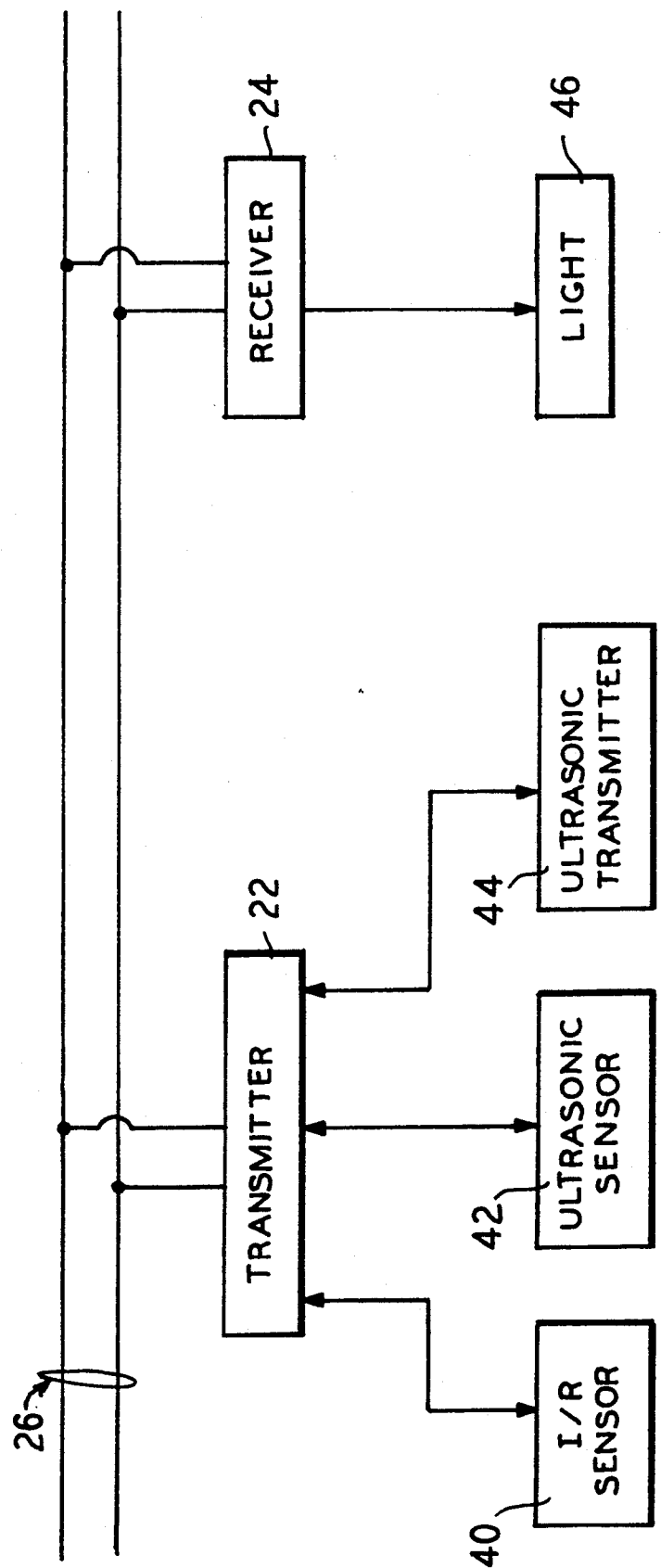
FIG. 2 depicts a representation of the connection of various optional sensors and detectors to a transmitter connected to a power line having a controlled receiver and light also connected thereto.
Figure 3:
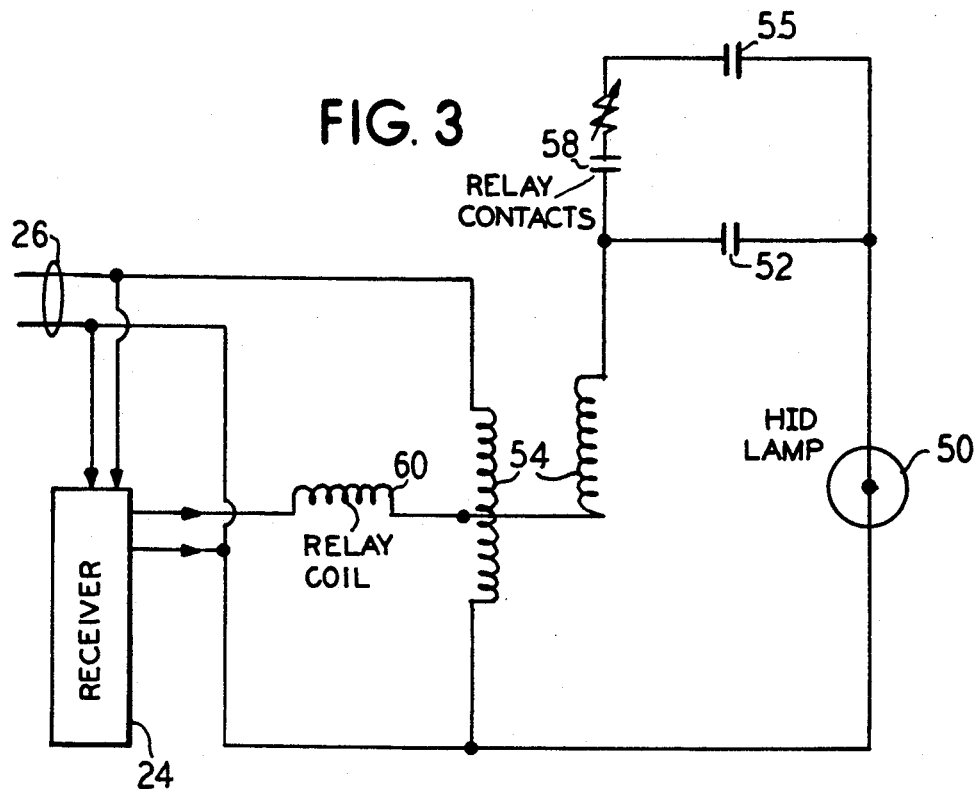
FIG. 3 is a schematic depicting a switched capacitor circuit for controlling a high intensity discharged lamp between bright and dim intensity settings.

As shown in FIG. 2, numerous types of motion detectors can be utilized with the present invention, such as infrared sensor 40, ultrasonic sensor 42 with corresponding ultrasonic transmitter 44, as well as other types of sensors known in the prior art which output a signal upon detecting a predetermined parameter. The parameter may be other than movement within a zone of detection, and can be used in the novel lighting system of the present invention. Also, each sensor can have its own transmitter associated with it, such as depicted in FIG. 1 or as depicted in FIG. 2 a number of sensors can be utilized with a single transmitter 22. Also depicted in FIG. 2 is a receiver 24 connected to the power line 26 for changing the level of illumination of lamp 46.

Figure 4:
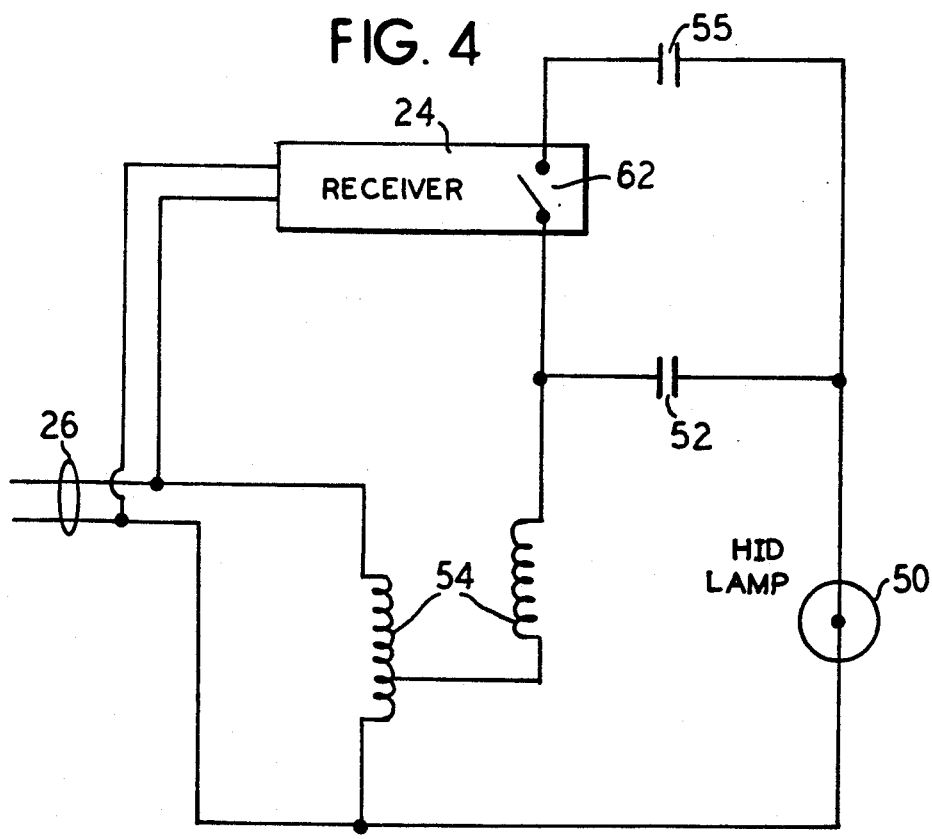
FIG. 4 is a circuit diagram of an alternative circuit for switched capacitor operation of a high intensity discharge lamp used in the present invention.

In a preferred embodiment of the present invention an HID lamp 50 is connected through a first capacitor 52 to a ballast transformer 54, which in turn is connected to the power line 26. A second capacitor 55 is connected from the high intensity discharge lamp 50 through a temperature control resistor 56 and relay contacts 58 to the ballast transformer 54. This circuit is known as a switched capacitor control circuit for changing the light intensity of the high intensity discharge lamp 50. The relay coil 60 is energized by the receiver 24 upon receiving the power line carrier signal addressed to it on the power line 26. Energizing the coil 60 causes the contacts 58 to close connecting in circuit the second capacitor 55 across the first capacitor 52. Direct line carrier control is also possible as depicted in FIG. 4, wherein the second capacitor 55 is connected across the first capacitor 52 directly by a set of contacts 62 in the receiver 24.

Figure 5:
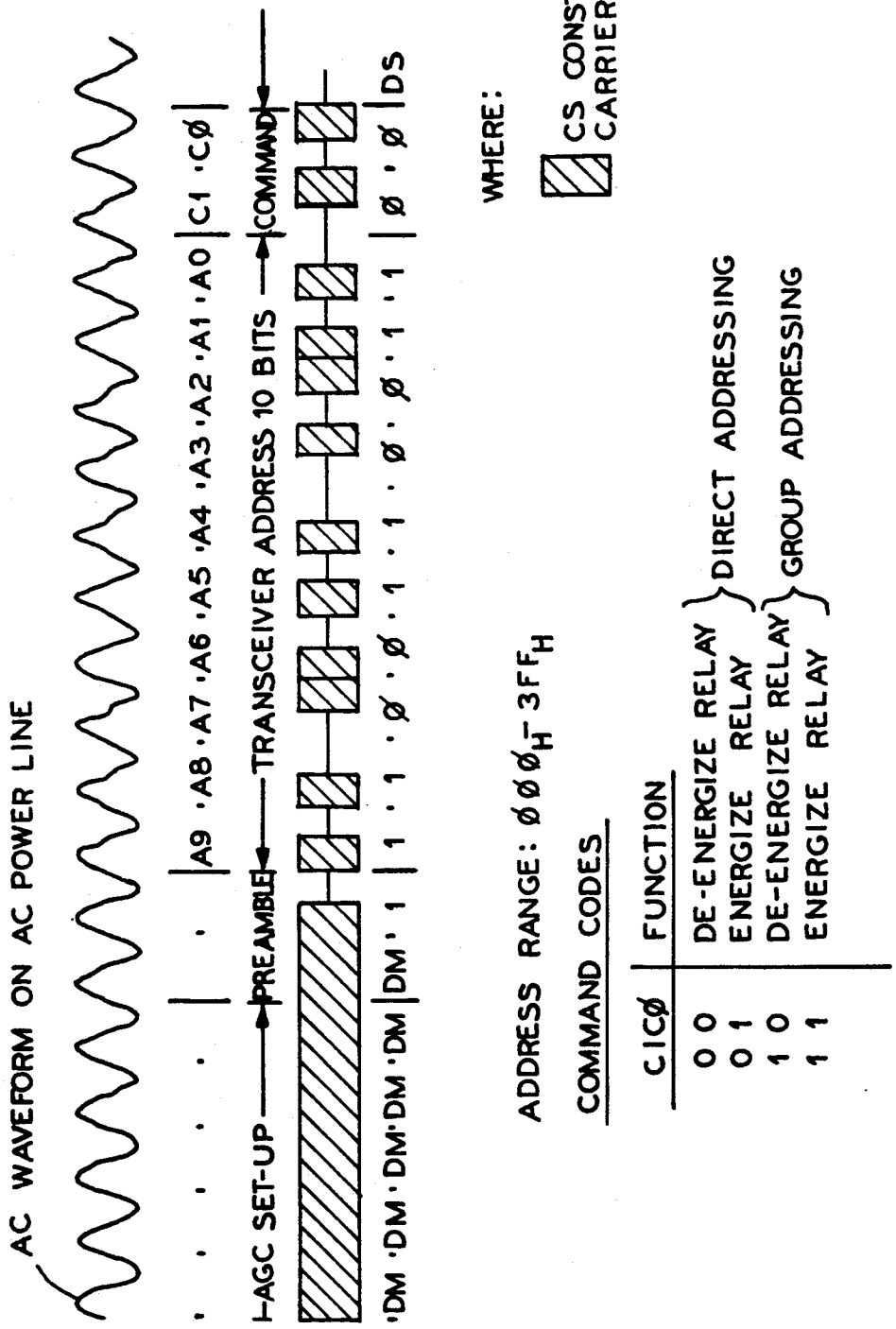
FIG. 5 is a diagram depicting a power line carrier signal sent by the transmitter to the receiver in the present invention.

FIG. 5 depicts the protocol of the power line carrier signal and, in general, in the preferred embodiment the signal has a sync burst portion composed of an AGC set up portion and a preamble portion, followed by an address portion, followed by a command portion. It is an advantage of the present invention that it is only important that the sync burst portion occur first. Any format for the following data can be designed into the system. Thus, the system could be designed such that the command portion occurs before the address portion. The address portion has 10 address bits, A9 through A0, and the command portion has two command bits C1 and C0, transmitted serially against 60 Hz zero crossings of the AC wave form on the AC power line. The twelve message bits are preceded by a period of carrier signal which serves as both a message start sequence and automatic gain control set up burst referred to as the sync burst. In the preferred embodiment the carrier has a frequency of 121 kilohertz. The sync burst can be arbitrarily long. The receivers used in the present invention tolerate sync burst length from as short as 1 and ½ line cycles to as long as infinity and ½ line cycle. The transmitters of the present invention emit a sync burst of 32 and ½ cycles in the preferred embodiment. The state lengths of the sync burst are in terms of ½ line cycles because the true sync burst includes a ½ cycle of no carrier just before the A9 address bit commences. As shown in FIG. 5 the minimum sync burst is a double mark than one, and the nominal sync burst is 32 double marks, than one. The receivers can handle an arbitrarily large number of double marks followed by a one. The double marks are equivalent to two consecutive ones.

Figure 6:
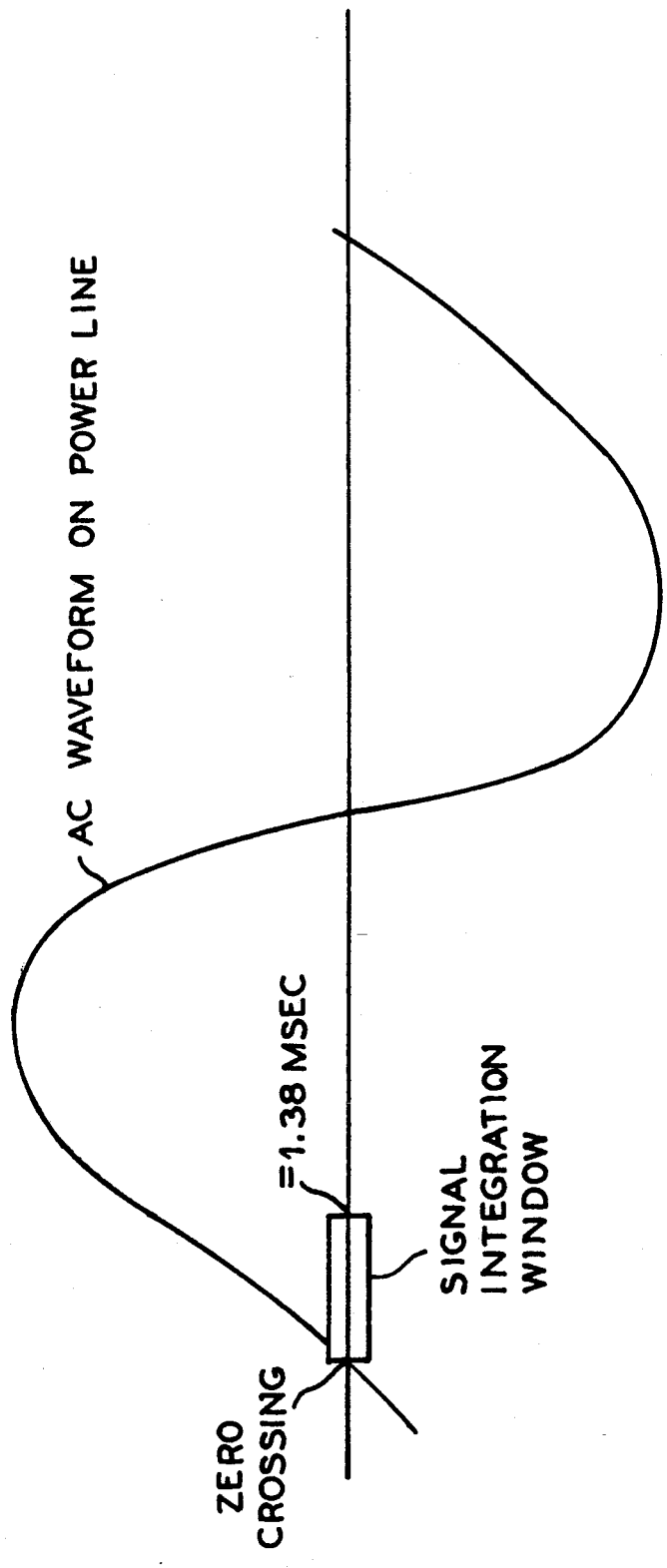
FIG. 6 is a diagram depicting a signal integration window used in the receiving of the power line carrier signal.

In the present invention a logical one is a constant 121 kilohertz carrier which is transmitted for substantially a complete ½ cycle of the AC waveform. The transmitters and receivers of the present invention both have circuits for detecting zero crossing of the AC waveform for synchronized purposes. The transmitters and receivers use the 60 Hz power line as the clocking reference for data. Though there is an assumption that all receivers and transmitters have precisely the same line frequency of 60 Hz, there is no guarantee that all modules experience simultaneous zero crossings. In the three phase power distribution system typically for industrial and commercial applications, there is a plus/minus 120° ambiguity from the start. In reality, modules may be wired with no particular polarity. It is possible that the transmitter may be wired from leg to neutral in a three phase WYE system while talking to receivers wired leg to leg, the actual skew in zero crossings between various modules in the system occurring in a multiple of 30° or 1.3 milliseconds This interval of 1.38 milliseconds defines what is referred to as a signal integration window in the present invention. The signal integration window begins at a zero crossing of the AC waveform and terminates approximately 1.38 milliseconds thereafter (see FIG. 6).

Figure 7:
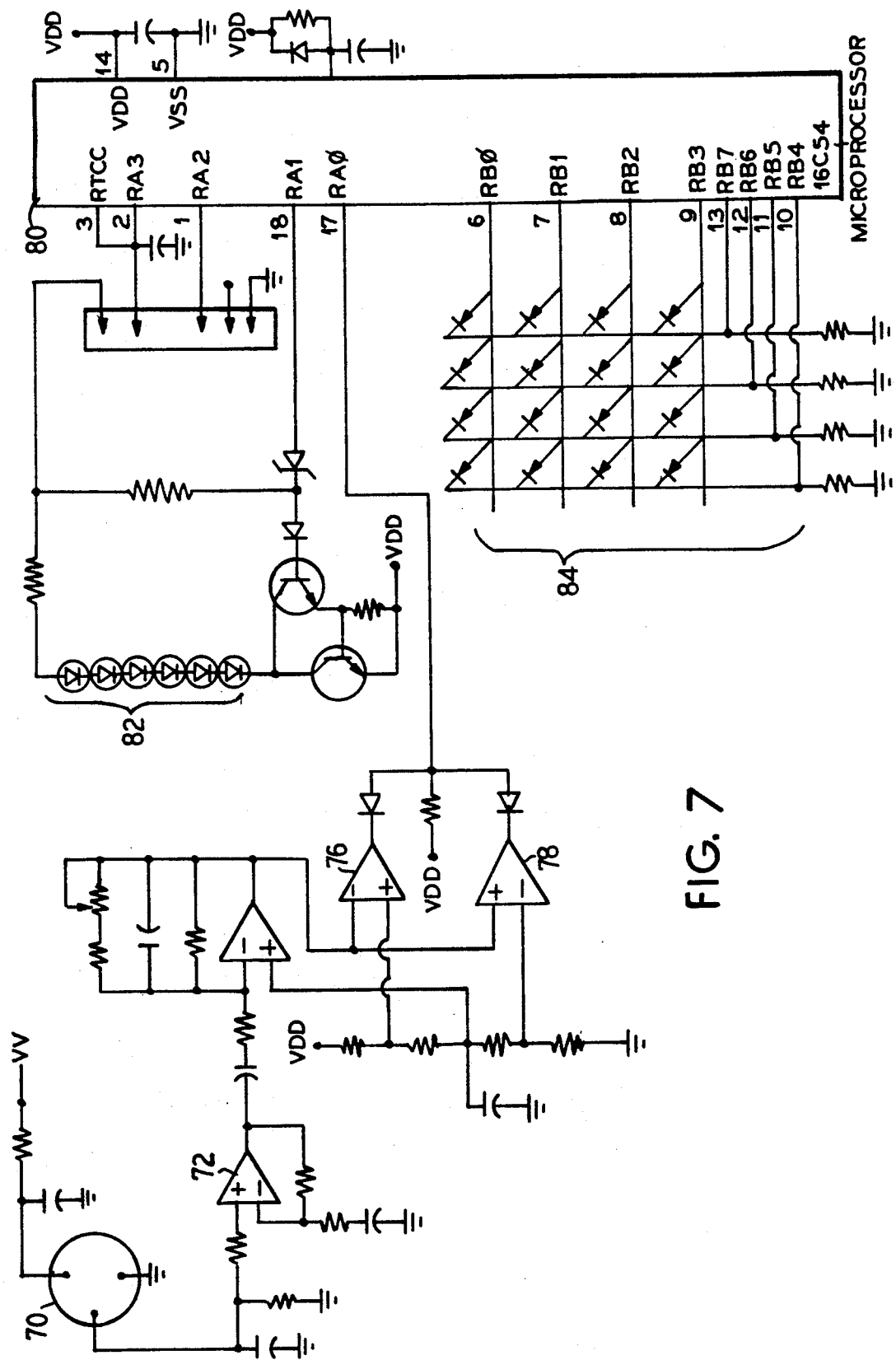
FIG. 7 is a circuit diagram of a first portion of the transmitter connected to a motion detector.

FIG. 7 is a schematic of a first portion of the transmitter connected to a motion detector 70. Upon detecting movement in a respective zone of detection, the motion detector 70 outputs a detect signal to comparator 72. Comparator 72 forwards the signal to a means for comparing the signal to a reference voltage comprised of comparators 74, 76 and 78 which then output a signal to the microprocessor 80. The microprocessor operates light emitting diodes 82 for signaling the mode of operation of the motion detector 70. In the first mode of operation the motion detector has not detected any movement in the zone of detection and the microprocessor 80 causes the diodes 82 to wink at a steady rate. In a second mode of operation the motion detector has detected movement and the microprocessor 80 causes the light emitting diodes 82 to flash three times indicating that a pulse line carrier signal has been transmitted. In the third mode of operation the motion detector 70 has detected movement and the microprocessor 80 flashes the light emitting diodes 82 in a different pattern which signals that the motion detector 70 is operational but that no pulse line carrier signal is being transmitted because the first predetermined time period has not yet ended. Network 84 is a matrix circuit for setting an address. In the preferred embodiment the microprocessor 80 is a 16C54 manufactured by a Microchip Technology Company. The microprocessor 80 receives o pin RA3 the signal indicative of the zero crossing of the 60 Hz AC waveform and outputs on pin RA2 a transmit signal when the motion detector has detected movement and begins the first predetermined time interval.

Figure 8:
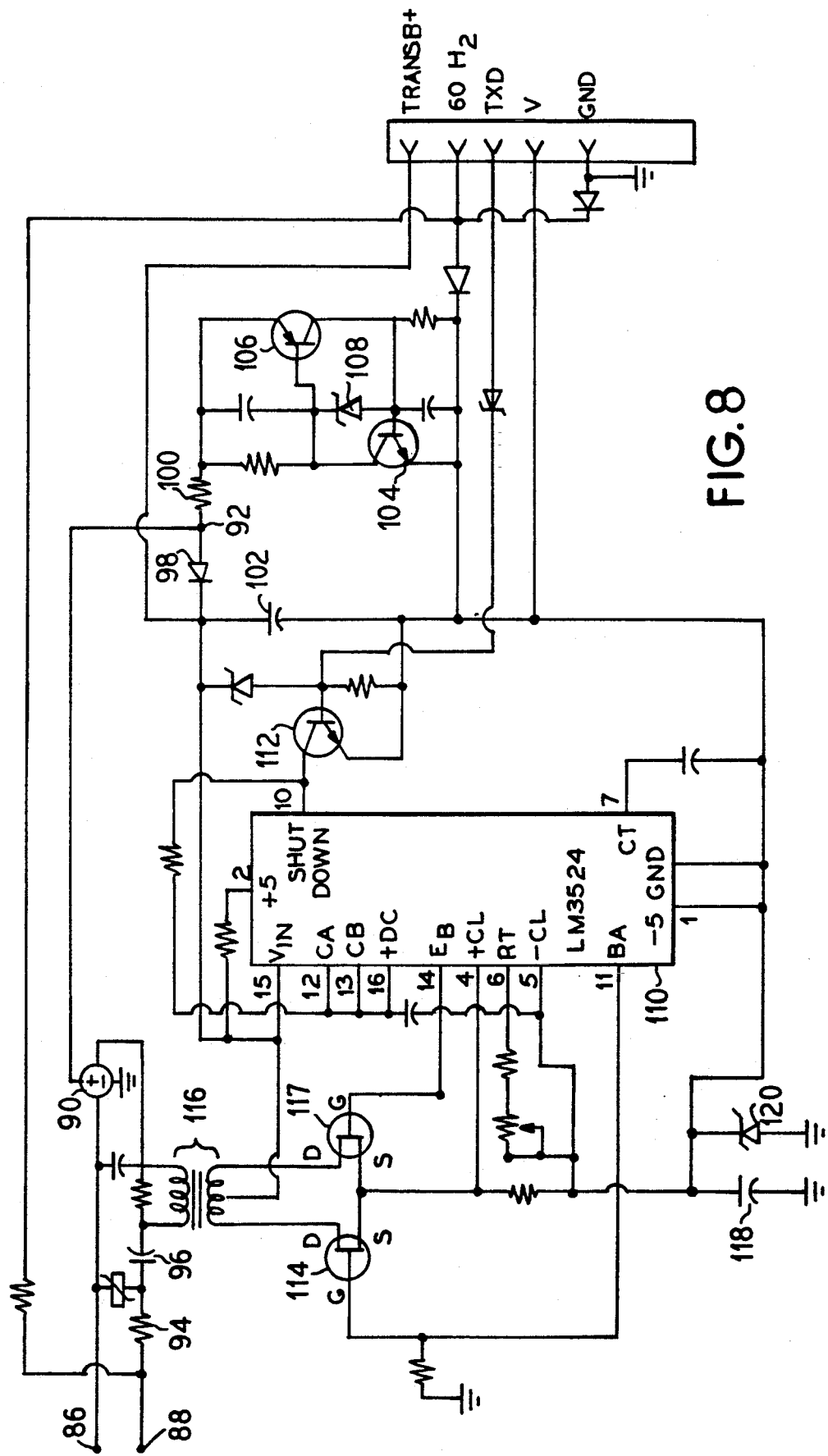
FIG. 8 is a circuit diagram of a second portion of the transmitter for outputting the power line carrier signal on the power line.

FIG. 8 depicts a circuit diagram of a second portion of the transmitter which is connected to the AC power lines at terminals 86 and 88. A bridge rectifier 90 connected to the terminals 86, 88 provides DC voltage to the power supply at terminal 92. The full wave power supply is comprised of resistors 94, capacitor 96, diode 98, resistor 100, capacitor 102 and transistors 102, 104 and 106 with their associated circuitry including zener diode 108 and will be described in detail below.

A switch mode power supply chip 110 which in the preferred embodiment is an LM3524 operates as a push-pull oscillator at 121 kilohertz. It receives on its "shutdown" pin a signal via transistor 112 on the transmit line TXD from the microprocessor 80. The switch mode power supply chip 110 along with its associated circuitry including transistor drivers 114 and 116 provides the pulse line carrier signal to the coupling transformer 117. The coupling transformer 117 is connected to the terminals 86 and 88 and therefore to the power line.

Capacitor 118 and the zener diode 120 form a second power supply for providing power to the switch mode power supply chip 110. The power supply utilizing transistors 104 and 106 forms an upper stack of a stacked power supply and in a preferred embodiment supplies approximately 30 volts whereas the capacitor 118 with the zener diode 120 forms a 5 volt power supply as the lower stack in the stacked power supply arrangement.

Figure 9:
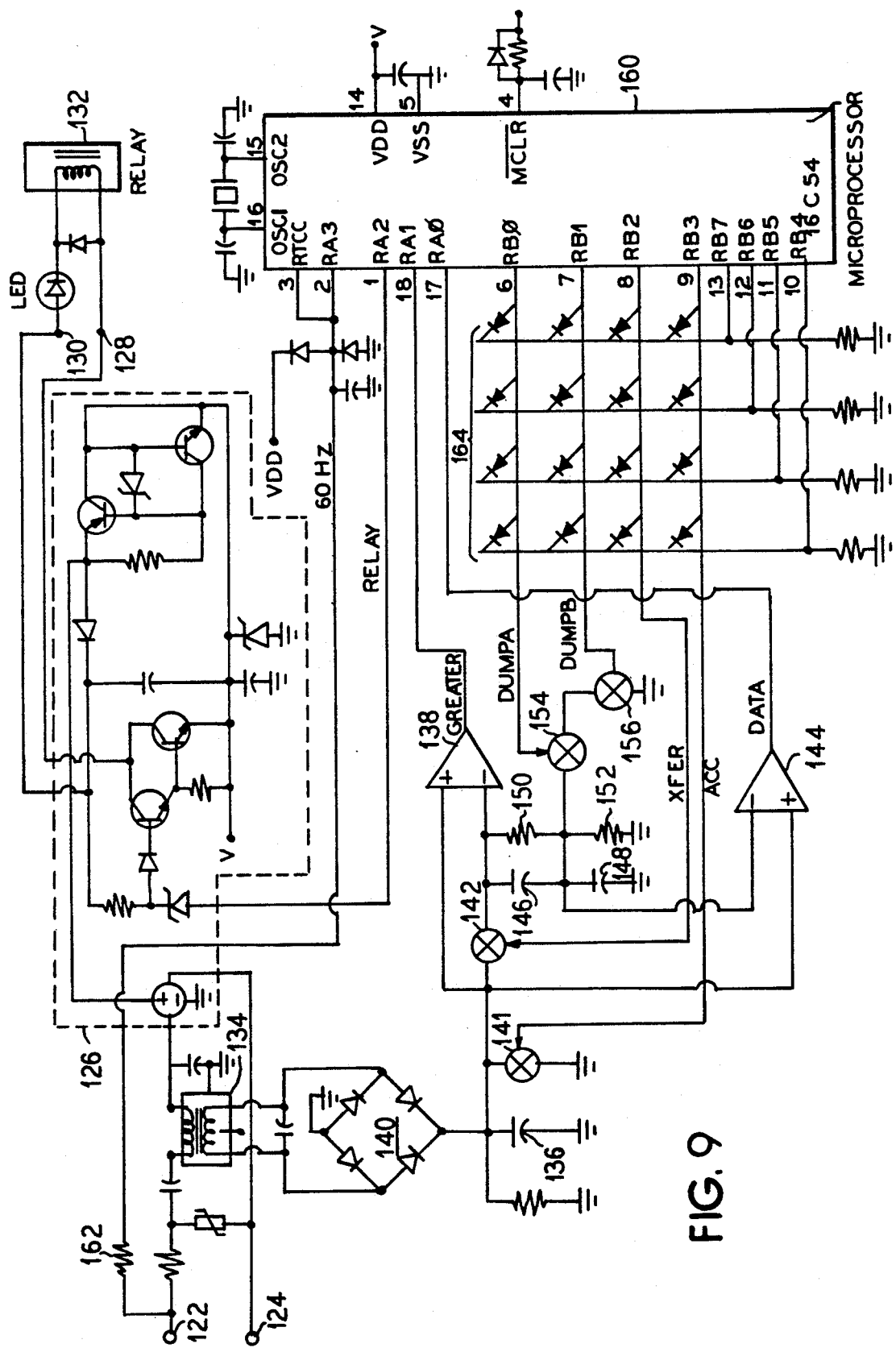
FIG. 9 is a circuit diagram of the receiver used in the present invention.

FIG. 9 is a schematic diagram of the receiver used in the present invention. The receiver is connected to the AC power line via terminals 122 and 124 to which is also connected the stacked power supply 126. Terminals 128 and 130 of the power supply 126 are connected to the relay 132 for switching a lamp connected thereto between the high intensity and dim setting levels. Transformer 134 receives the power line carrier signal from the AC power line and is connected to signal capacitor 136 via bridge 140. The signal capacitor 136 is connected to the positive input of a first comparator 138, to a first switch to ground 141, to a second switch 142 and to a positive input of a second comparator 144. The negative input of the comparator 138 is connected through capacitors 146 and 148 to ground and through resistors 150 and 152 to ground as depicted in FIG. 9. The juncture of capacitors 146 and 148 as well as resistors 150 and 152 is connected to a third switch 154 and to the negative input of the second comparator 144. The switch 154 is also connected to a fourth switch 156 which is also connected to ground. Each of the switches 141, 142, 154 and 156 are controlled by the microprocessor 160 and in the preferred embodiment are 4066 CMOS switches. Also, the outputs of the comparators 138 and 144 are connected to the microprocessor 160. The microprocessor 160 receives a signal indicative of the AC zero crossings of the AC waveform on the power line on pin RA3 via resistor 162 which is connected to terminal 122 of the power line. Network 164 provides the means for setting the address of the receiver. Pin RA2 of the microprocessor 160 carries a relay signal for operating the relay 132. The operation of the transmitter and receiver in conjunction with the power line carrier signal will now be described.

In the prior art, the data channel was sampled by receivers for the presence of carrier at one or two points during the time when carrier might be present. The prior art offers insufficient noise immunity. Receivers of the present invention have a charge pump automatic gain control circuit that accumulates signal current during the entire 1.38 millisecond signal integration window and stores it on a small capacitor (136 in FIG. 9). The microprocessor 160 samples this capacitor voltage once at the end of the window and uses the remaining 6.95 milliseconds until the next zero-crossing to further process the charge in that capacitor.

Capacitors 146 and 148 in the receiver are series-connected to form a large long-term storage capacitor $C_{ave}$ whose voltage is the recent average peak voltage on the signal integration capacitor, 136. This recent average peak characteristic is achieved by loading $C_{ave}$ with the contents of 136 only if the voltage on 136 exceeds the voltage on $C_{ave}$. The comparator 138 constantly compares the voltage on capacitor 136 to the voltage on $C_{ave}$ and indicates GREATER=1 to the microprocessor 160 if the accumulated voltage on 136 exceeds that on $C_{ave}$. This estimation has meaning only at 1.38 milliseconds after zero-crossings, and is sampled by the microprocessor 160 only at that point. If the sample is GREATER=1, the microprocessor 160 closes CMOS switch 142 (XFER=1) for 100 microseconds to transfer 136's charge to $C_{ave}$. If GREATER=0 at 1.38 milliseconds, then XFER=0 and the CMOS switch 142 remains open and $C_{ave}$ is unaffected by the sample.

The duration of XFER is not critical. However, less than 50 microseconds gives insufficient time for the capacitors to equilibrate. Because the signal current from the detection circuit is not inhibited during XFER, greater than 150 microseconds permits $C_{ave}$ to acquire extra (erroneous) charge not resulting from the signal integration window.

$C_{ave}$ is deliberately split into two series-connected capacitors of equal value. The voltage at $C_{ave}$'s midpoint is one-half of the recent average peak signal integration voltage. This node serves as a reference voltage for establishing the boundary between DATA=0 and DATA=1, i.e. the level of voltage on capacitor 136 which indicates that a signal was present during the signal integration window. The comparator 144 continuously compares the voltage on 136 with the midpoint of $C_{ave}$ and indicates DATA=1 if the voltage on 136 is at least half of the voltage on $C_{ave}$. This estimation is, of course, valid only at 1.38 milliseconds after zero-crossing and is sampled by the microprocessor 160 only at that point.

After the XFER period has concluded, the charge on capacitor 136 is no longer useful and can be dissipated to ground via CMOS switch 141 upon assertion of ACC=1 by the microprocessor 160. The microprocessor 1 60 can assert ACC=1 continuously until the next zero-crossing and the start of the next signal integration window.

Immediately after power-on reset all three capacitors in the AGC charge pump should be emptied by the microprocessor 160 asserting XFER=ACC=DUMPA=DUMPB=1.

A phenomena in the AGC scheme exists in applications with multiple transmitters, each emitting a different signal strength. The average recent peak signal voltage stored on $C_{ave}$ dissipates over several seconds through self-leakage and the effects of resistors 150 and 152 in FIG. 9. A problem arises when a message of feeble signal strength follows a strong-signal message from a different transmitter. It is possible for the feeble-yet-otherwise-detectable second message to be missed entirely if the voltage at $C_{ave}$'s midpoint has not yet decayed to a low value consistent with the feeble message's signal strength.

If the AGC's natural decay time is shortened by lowering the values of resistors 150 and 152, then the voltage on $C_{ave}$ is noticeably low compared to its true value because a significant fraction of each capacitor 136 charge XFER is consumed offsetting the leakage since the previous XFER. Furthermore, the AGC scheme's noise floor (the point at which background noise current gives rise to enough XFERs to offset $C_{ave}$ leakage) is raised if resistors 150 and 152 are reduced. Testing with existing components has shown the noise floor to be around 10 millivolts of effective power line carrier signal if the AGC decay period is several seconds.

The receiver's software can incorporate a design option called message-induced AGC initialization wherein $C_{ave}$ is forcibly emptied by the microprocessor 160 upon the receipt of a packet of data properly formatted. Doing this effectively forces subsequent packets to be equipped with a full 32 cycles of AGC set-up carrier. The down-side of message-induced AGC initialization can be eased if the re-initialization is held in abeyance for, say, two line cycles after the end of a packet to ascertain whether a subsequent packet from the same transmitter was received.

The 28-pin version of the micro is more expensive and consumes precious PC board space. Clever (albeit code-consuming) sharing of the column drivers of the DIP switch array with the XFER, ACC, DUMPA and DUMPB lines to the CMOS switches is necessary. If the switch array is read only at power-on reset, the function-sharing is no problem. However, reading vital set-up data only upon power-up in a non-watchdog system is risky in light of transients. The software should redundantly read the switch array several times per minute in conjunction with AGC activities In the preferred embodiment ACC is asserted for AGC purposes twice per line cycle. Because the CMOS switches 154, 156 associated with the DUMPA and DUMPB lines are connected in series, they can be individually (though not jointly) asserted at any time without harming the charge associated with $C_{ave}$. A great deal of AGC-caused activity on XFER occurs during transmissions (GREATER=1 transfers) and between transmissions (noise-induced XFERs to overcome $C_{ave}$ leakage). Only during the decay period after a strong transmission is there a scarcity of XFER activity, but that lasts only a few seconds.

As previously discussed, between transmission the AGC voltage decays to a very low value. The precise value is a function of $C_{ave}$ leakage, resistors 150 and 152, and background noise on the power line. Even with a quiet power line, the occurrence of random DATA=1 pulses is frequent because some XFER activity is necessary to support AGC leakage. The decoding algorithm of the microprocessor 160 is able to cope with this randomness on DATA.

Owing to the usage of a full-wave bridge rectifier and stacked supply voltages, only the upward transition on pins #2 and #3 of the microprocessor 160 is a reliable indicator of 60 Hz zero-crossing. The downward transition is "late" relative to true zero-crossing by a significant amount that renders it useless. This means that the microprocessor 160 must derive the timing of the downward zero-crossing from the positive zero-crossing using its onboard counters and software. Other circuits of course could be utilized to detect zero crossings of the AC waveform.

Option Jumpers can be provided in the receiver for determining the receiver's operation with different types of lamps. Depending on the state of Options Jumper #1, the receiver's relay should go to the energized or unenergized state after power on reset. This permits the use of double-throw relays and permits applications that default to either an ON or OFF state.

OPTION #1 PRESENT = ENERGIZED
OPTION #2 ABSENT = UNENERGIZED

Option Jumper #2 concerns the use of the receiver with HID lighting fixtures and motion detectors. In HID applications the lamp requires an eight minute period of full ballast current after power is applied for self-warming purposes. Furthermore, all HID applications assume the presence of motion detectors that squall PLC ON commands to the receiver when personnel motion is observed. In order to minimize the number of times a motion detector has to squall, the HID receiver will "time out" on its own after 5 minutes of silence from the motion detector. More precisely:

OPTION #2 PRESENT=ORDINARY (NON-HID) APPLICATIONS

After power is applied to the receiver, the relay status suggested by Option Jumper #1 should be assumed and the receiver should commence listening for PLC commands immediately.

OPTION #2 ABSENT=HID/MOTION DETECTOR APPLICATIONS

After power is applied to the receiver, the relay should be energized for 8 minutes (regardless of the state of Options Jumper #1) during which all PLC commands to the receiver are ignored. After 8 minutes, the relay should de-energize and await PLC commands. If the subsequent PLC command is ENERGIZE, the micro should do so but return the relay to the unenergized state 5 minutes later unless a second RELAY ENERGIZE command is received to renew the state.
Regardless of the relay's state (after the 8 minute warm up) it should assume the de-energized state if instructed to by a DE-ENERGIZE command. DE-ENERGIZE commands do not expire after 5 minutes.

Three adjacent jumpers define the receiving module's group address. There are eight possible group addresses and a pair of group commands: GROUP ON and GROUP OFF. If a group command is received, the three high-order address bits in the command are compared to the group address bits defined in Options Jumpers #3, 4, 5. If a match is found, the group command is acted upon.

The highest order ten-bit address, 3FF$_H$, shall serve as a global address to which all modules respond.

The motion detector in the preferred embodiment is a PAIR motion detector with a microprocessor, PLC modulator, and LED diagnostic lamp. Personnel motion in the aisle below the detector is signified by negative transitions on pin #7 of the motion detector's microprocessor. The motion detector contains a transmission timer whose purpose is to minimize the number of unnecessary ENERGIZE commands sent.

After a motion detector energizes a a receiver relay with a power line carrier command, the energized state is locked for 5 minutes. The motion detector's software takes advantage of this receiver feature to dispense with unnecessary and redundant power line carrier commands in the face of sustained personnel motion. In the presence of continuous motion activity on pin #17 of the microprocessor, the motion detector will squall an ENERGIZE command every 4.5 minutes, just in time to re-initialize the receiver's 5 minute timer. In the presence of sporadic personnel motion, the motion detector will issue an ENERGIZE command at the 4.5 minute point if the sporadic activity is noted between 4.0 and 4.5 seconds after the last transmission. In other words, the receiver is renewed with an ENERGIZE command if (and only if) the personnel motion is recent, recent being defined as the 30 seconds prior to the targeted receiver renewal point.

Because HID-defined receivers automatically enter an energized state for 8 minutes after a power on reset, power line carrier commands form a motion detector during this period are useless. The motion detector software assumes that all system modules, receivers and motion detectors, lose and regain AC power at the same time and that personnel motion observed during nearly all of the 8 minutes after restoration of AC power are meaningless. During this interval the power line carrier modulator is silent. After the 8 minute point after restoration of AC power, motion pulses on pin #17 take on the importance of those 4.0-4.5 minute pulses discussed above and result in an ENERGIZE command at the 8.5 minute point. Note that this is just after the receivers are available and begin to accept power line carrier commands. Also there is no overlap to prevent a brief receiver relay deenergization after they are available and before the related motion detector issues its first ENERGIZE command.

The motion detector has a diagnostic LED that permits the installer to note:
Detector I'm OK status
Motion in the detector's field of view
Issuance of an ENERGIZE command In the preferred embodiment I'm OK flashes are 0.25 seconds long and spaced 5 seconds apart. Actual observed motion results in a 2-second long flash that can occur no sooner than 5 seconds after the last motion observed flash. However, if the condition of the motion detector's transmit timer dictates that motion should result in an E transmission, the motion observed flash of the LED is dispensed with entirely to preserve supply current. At the appropriate time the microprocessor initiates the power line carrier command. After the ENERGIZE transmission is finished, the microprocessor signifies such by blinking the LED in rapid succession three times: 0.15 second duration spaced 0.5 seconds apart.

Figure 10:
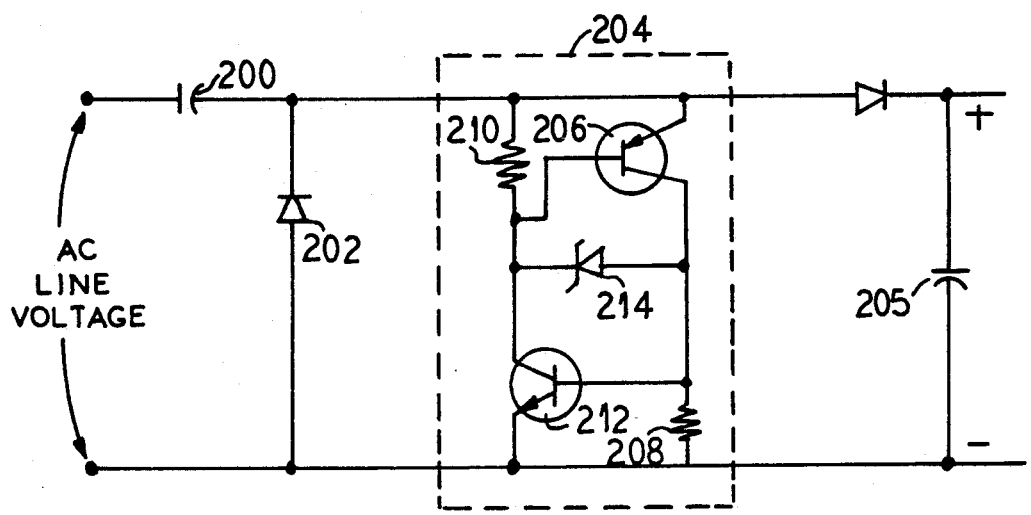
FIG. 10 is a schematic diagram of a novel power supply used in the transmitter and receiver of the present invention.
Figure 11:
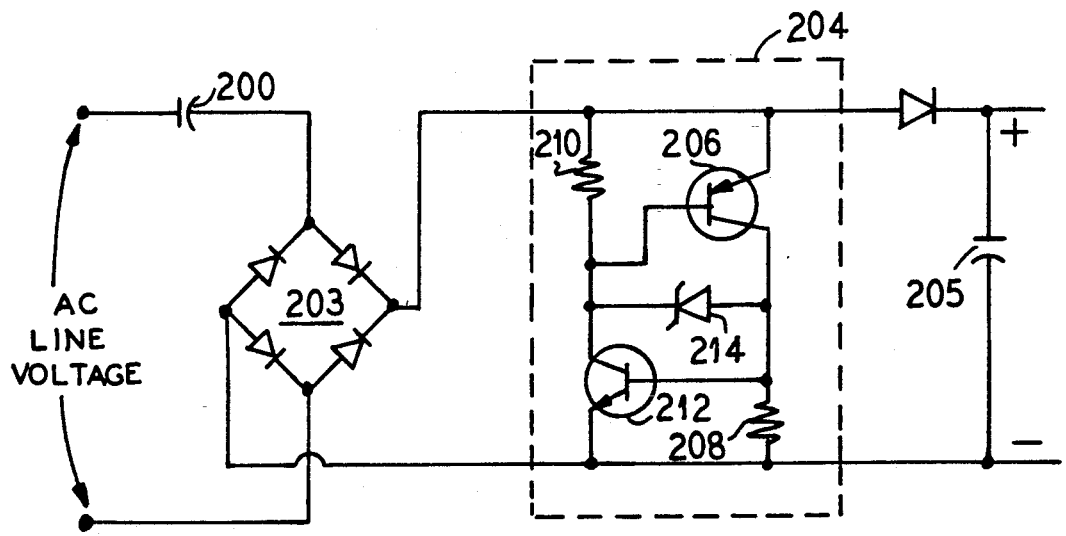
FIG. 11 is a schematic diagram of another novel power supply used in the transmitter and receiver of the present invention.

The power supply used in the transmitters and receivers of the present invention is a charge pump power supply. FIG. 10 depicts a ½ wave supply and FIG. 11 depicts a full wave supply. In both circuits a high voltage capacitor 200 is charged on one cycle of the AC power line and discharged on the other cycle of the AC power line, via diode 202 in FIG. 10 and via bridge 203 in FIG. 11. These power supplies are fixed current supplies relative to the voltage level of the AC line.

In order to provide a predetermined current output, a bistable switch 204 is provided as shown in FIGS. 10 and 11. During a ½ cycle of the AC line the switch 204 periodically closes. This allows the capacitor 205 to charge to its predetermined value, after which the charge on capacitor 200 is returned to the AC power line via the bistable switch 204. Thus, current from the AC power line which is not needed by the module is returned to the AC power line.

A first transistor 206 has its emitter connected to the capacitor 200, its collector connected to one side of the line via a first resistor 208, and its base connected to the capacitor 200 via a second resistor 210. A second transistor 212 has its emitter connected to the one side of the line, its collector connected to the base of the first transistor and its base connected to the collector of the first transistor. A zener diode 214 is connected from the collector of the first transistor 206 to the collector of the second transistor 212.

When the charge o the capacitor 205 reaches its predetermined value, the transistor 206 and 212 turn on and the direction of connection of the zener diode is reversed. When the transistors 206 and 212 are in an off state the zener diode 214 only conducts current after capacitor 205 reaches its predetermined value. At this point in time the bases of transistors 206 and 212 rise in voltage level turning on transistors 206 and 212. When both transistors 206 and 212 are on they feed their own base currents. Finally, when the AC power line reverses the zener 214 stops current flow causing transistors 206 and 212 to turn off.

Thus this power supply can automatically operate with different line voltages, that is with an extended min/max line voltage range.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. Power line carrier controlled lighting system connected to an AC power line, comprising:
    at least one means for detecting at least one predetermined parameter in a detection zone of said at least one means for detecting, said means for detecting outputting at least one detect signal in response to said at lest one predetermined parameter;
    at least one means for transmitting during a first predetermined time period a power line carrier signal on the AC power line indicative of said at least one detect signal;
    at least one means for receiving said power line carrier signal on the AC power line and outputting at least one control signal indicative of the power lien carrier signal during a second predetermined time period, said means for receiving having means for providing substantial noise immunity so that said means for receiving reliably recognizes said power line carrier signal;
    said means for providing substantial noise immunity having means for acquiring signal current of the power line carrier signal during a signal integration window and means for identifying a presence of the power line carrier signal from the acquired signal current at an end of the signal integration window; and
    at least one means for providing light in a predetermined area and having at least two different light intensity levels, said means for providing light having means for changing between said at least two light intensity levels, said means for changing being activated by said at lest one control signal.

2. The power line carrier controlled lighting system according to claim 1, wherein said power line carrier signal is a digital signal having logical ones and zeros and wherein said means for providing substantial noise immunity is a. variable means for determining a logical one/zero reference level.

3. The power line carrier controlled lighting system according to claim 2, wherein said power line carrier signal is substantially synchronized to zero crossings of an AC waveform on the AC power line.

4. The power line carrier controlled lighting system according to claim 3, wherein said power line carrier signal has; a sync burst portion having at least a preamble portion, followed by a message portion having an address portion having a first predetermined number of address bits and a control portion having a second predetermined number of control bits.

5. The power line carrier controlled lighting system according to claim 4, wherein said sync burst portion further has a period of carrier formed by a plurality of logical double marks before said preamble portion.

6. The power line carrier controlled lighting system according to claim 4, wherein said preamble portion comprises a logical double mark followed by a logical one.

7. The power line carrier controlled lighting system according to claim 4, wherein said address portion comprises ten address bits.

8. The power line carrier controlled lighting system according to claim 4, wherein said control portion comprises two control bits.

9. Power line carrier controlled lighting system connected to an AC power line, comprising:
    at least one means for detecting at least one predetermined parameter in a detection zone of said at least one means for detecting, said means for detecting outputting at least one detect signal in response to said at least one predetermined parameter;
    at least one means for transmitting during a first predetermined time period a power line carrier signal on the AC power line indicative of said at least one detect signal;
    at least one means for receiving said power line carrier signal on the AC power line and outputting at least one control signal indicative of the power line carrier signal during a second predetermined time period, said means for receiving having means for providing substantial noise immunity so that said means for receiving reliably recognizes said power line carrier signal;
    at least one means for providing light in a predetermined area and having at lest two different light intensity levels, said means for providing light having means for changing between said at least two light intensity levels, said means for changing being activated by said at least one control signal;
    said power line carrier signal being a digital signal having logical ones and zeros, said means for providing substantial noise immunity being a variable means for determining a logical one/zero reference level, and said power line carrier signal being substantially synchronized to zero crossings of an AC waveform on the AC power line;
    said means for determining a logical one/zero reference level having;
    means for accumulating and storing signal current of the received power line carrier signal as a first voltage during each predetermined signal integration window of a plurality of signal integrating windows;
    means for forming a recent average peak voltage from at least a plurality of first voltages during a respective plurality of one-half cycles of the AC waveform on the AC power line;

first means for comparing said first voltage, at least at substantially the end of said signal integration window, to said recent average peak voltage;

means for substantially adding said first voltage to said recent average peak voltage when said first means for comparing determines that said first voltage is greater than said average peak voltage at substantially the end of said signal integration window;

means for substantially zeroing said means for accumulating and storing after the end of said signal integration window;

second means for comparing said first voltage to a predetermined percentage of said recent average peak voltage at least at substantially the end of the predetermined signal integration window, and when said second means for comparing determines that said first voltage is greater than said predetermined percentage of said average peak voltage, said means for receiving recognizes a logical one and, when said second means for comparing determines that said first voltage is less than said predetermined percentage of said average peak voltage, said means for receiving recognizes a logical zero.

10. The power line carrier controlled lighting system according to claim 9, wherein said power line carrier signal has a high frequency carrier which substantially continuously occurs during a half cycle of the AC waveform to represent a logical one, a logical zero being represented by an absence of said high frequency carrie, and a logical double mark being represented by two consecutive logical ones.

11. The power line carrier controlled lighting system according to claim 10, wherein said power line carrier signal has a sync burst portion having at least an AGC set up portion consisting of a plurality of logical double marks.

12. The power line carrier controlled lighting system according to claim 11, wherein said AGC portion consists of approximately 32 logical double marks.

13. The power line carrier controlled lighting system according to claim 12, wherein said sync burst has a preamble portion consisting of a logical double mark followed by a logical one, said preamble portion following said AGC set up portion.

14. The power line carrier controlled lighting system according to claim 9, wherein said predetermined signal integration window substantially begins at a zero crossing of the AC waveform on the AC power line and ends before the next zero crossing of the AC waveform.

15. The power line carrier controlled lighting system according to claim 14, wherein said predetermined signal integration window ends at substantially 1.38 milliseconds after a beginning of said predetermined signal integration window.

16. The power line carrier controlled lighting system according to claim 9, wherein said means for accumulating and storing is substantially zeroed after approximately 50 milliseconds to 150 milliseconds when said first voltage is added to said recent average peak voltage at the end of said signal integration window.

17. Power line carrier controlled lighting system connected to an AC power line, comprising:

at least one means for detecting at least one predetermined parameter in a detection zone of said at least one means for detecting, said means for detecting outputting at least one detect signal in response to said at least one predetermined parameter;

at least one means for transmitting during a first predetermined time period a power line carrier signal on the AC power line indicative of said at least one detect signal;

at least one means for receiving said power line carrier signal on the AC power line and outputting at least one control signal indicative of the power line carrier signal during a second predetermined time period, said means for receiving having means for providing substantial noise immunity so that said means for receiving reliably recognizes said power line carrier signal;

at least one means for providing light in a predetermined area and having at least two different light intensity levels, said means for providing light having means for changing between said at least two light intensity levels, said means for changing being activated by said at least one control signal; and said at least one means for detecting having means for indicating at least these modes of operation, a first mode of operation being an OK status, a second mode of operation being a DETECT status and a third mode of operation being a TRANSMIT status, said means for indicating providing different first, second and third visual signals corresponding respectively to the first, second and third modes of operation.

18. The power line carrier controlled lighting system according to claim 1, wherein means for receiving further has means for initialization for operating said means for providing light at one of said light intensity levels for a predetermined warm up period during which said means for receiving does not acknowledge any power line carrier signal.

19. Power line carrier controlled lighting system connected to an AC power line comprising:

plurality of means for detecting movement in associated detection zones of said plurality of means for detecting, each of said means for detecting outputting at least one detect signal in response to detected movement in its respective zone;

plurality of means connected to said means for detecting and transmitting, for transmitting only once during a first predetermined time period, a respective power line carrier signal on the AC power line indicative of said respective at least one detect signal;

plurality of addressable means for receiving said power line carrier signal on the AC power line, each means for receiving outputting at least one control signal indicative of a respective power line carrier signal addressed to that means for receiving only once during a second predetermined time period, said respective means for receiving cancelling said control signal if said respective means for receiving does not receive another power line carrier signal during said second predetermined time period, said first predetermined time period being less than said second predetermined time period, each of said means for receiving having means for providing substantial noise immunity so that said respective means for receiving reliably recognizes said power line carrier signal; and plurality of means connected to said plurality of addressable means for receiving, for providing light in a predetermined area and each having at least two different light intensity levels, said plurality of means for providing light each having means for switching between said light intensity levels, said means for switching being activated by said control signal of said respective mean for receiving.

20. The power line carrier controlled lighting system according to claim 19, wherein said power line carrier signal is a digital signal and wherein said means for providing substantial noise immunity is a variable means for determining a logical one/zero reference level.

21. The power line carrier controlled lighting system according to claim 20, wherein said power line carrier signal is substantially synchronized to zero crossings of an AC waveform on the AC power line.

22. The power line carrier controlled lighting system according to claim 21, wherein said power line carrier signal has a sync burst portion having at least a preamble portion, followed by a message portion having an address portion having a first predetermined number of address bits and a control portion having a second predetermined number of control bits, said sync burst portion further having a period of carrier forming an AGC set up portion before said preamble portion.

23. The power line carrier controlled lighting system according to claim 22, wherein each of said means for receiving has means for recognizing at least an individual address and a group address.

24. The power line carrier controlled lighting system according to claim 22, wherein each of said means for receiving has means for recognizing at least an individual address, a global address and a group address, a highest order address bit setting being the global address to which all means for receiving respond, three high order address bits being a group address when they correspond to a stored group address in the means for receiving.

25. Power line carrier controlled lighting system connected to an AC power line, comprising:
   at least one means for detecting at least one predetermined parameter in a detection zone of said at least one means for detecting, said means for detecting outputting at least one detect signal in response to said at least one predetermined parameter;
   at least one means for transmitting during a first predetermined time period a power line carrier signal on the AC power line indicative of said at least one detect signal, said at least one means for transmitting having a charge pump power supply having means for switching for power supply current control and for outputting a fixed current in a range of different voltage levels of the AC power line;
   at least one means for receiving said power line carrier signal on the AC power line and outputting at least one control signal indicative of the power line carrier signal during a second predetermined time period, said means for receiving having means for providing substantial noise immunity so that said means for receiving reliably recognizes said power line carrier signal, said at least one means for receiving having a charge pump power supply having means for switching for power supply current control and for outputting a fixed current in a range of different voltage levels of the AC power line; and
   at least one means for providing light in a predetermined area and having at least two different light intensity levels, said means for providing light having means for changing between said at least two light intensity levels, said means for changing being activated by said at least one control signal.

26. The power line carrier controlled lighting system according to claim 25, wherein said power line carrier signal is a digital signal having logical ones and zeros and wherein said means for providing substantial noise immunity is a variable means for determining a logical one/zero reference level.

27. The power line carrier controlled lighting system according to claim 26, wherein said power line carrier signal is substantially synchronized to zero crossings of an AC waveform on the AC power line.

28. Power line carrier controlled lighting system connected to an AC power line, comprising:
   at least one means for detecting at least one predetermined parameter in a detection zone of said at least one means for detecting, said means for detecting outputting at least one detect signal in response to said at least one predetermined parameter;
   at least one means for transmitting during a first predetermined time period a power line carrier signal on the AC power line indicative of said at least one detect signal, said at least one means for transmitting having a charge pump power supply having means for switching for power supply current control;
   at least one means for receiving said power line carrier signal on the AC power line and outputting at least one control signal indicative of the power line carrier signal during a second predetermined time period, said means for receiving having means for providing substantial noise immunity so that said means for receiving reliably recognizes said power line carrier signal, said at least one means for receiving having a charge pump power supply having means for switching for power supply current control;
   at least one means for providing light in a predetermined area and having at least two different light intensity levels, said means for providing light having means for changing between said at least two light intensity levels, said means for changing being activated by said at least one control signal;
   said power line carrier signal being a digital signal having logical ones and zeros and said mean for providing substantial noise immunity being a variable means for determining a logical one/zero reference level; and
   each of said charge pump power supplies in said at least one means for transmitting and in said at least one means for receiving having an input means for rectifying connected to an output means for providing a predetermined DC voltage, and each of said means for switching in said at least one means for transmitting and in said at least one means for receiving having a series circuit consisting of at least a first transistor, a zener diode, and a second transistor, a base of said first transistor connected to one terminal of said zener diode, and a base of said second transistor connected to another terminal of said zener diode, and a first resistor connecting said base of said first transistor to its emitter and a second resistor connecting said base of said second transistor to its emitter.

29. Power line carrier controlled lighting system connected to an AC power line, comprising:
   at least one means for detecting at least one predetermined parameter in a detection zone of said at least one means for detecting, said means for detecting outputting at least one detect signal in response to said at least one predetermined parameter;

at least one means for transmitting during a first predetermined time period a power line carrier signal on the AC power line indicative of said at least one detect signal, said at least one means for transmitting having a charge pump power supply having means for switching for power supply current control;

at least one means for receiving said power line carrier signal on the AC power line and outputting at least one control signal indicative of the power line carrier signal during a second predetermined time period, said means for receiving having means for providing substantial noise immunity so that said means for receiving reliably recognizes said power line carrier signal, said at least one means for receiving having a charge pump power supply having means for switching for power supply current control;

at least one means for providing light in a predetermined area and having at least two different light intensity levels, said means for providing light having means for changing between said at least two light intensity levels, said means for changing being activated by said at least one control signal;

said power line carrier signal being a digital signal having logical ones and zeros and said means for providing substantial noise immunity being a variable means for determining a logical one/zero reference level; and each of said charge pump power supplies in said at least one means for transmitting and in said at least one means for receiving having an input means for rectifying connected to an output means for providing a predetermined DC voltage and each of said means for switching in said at least one means for transmitting and in said at least one means for receiving being connected across the connection of said input means to said output means, said means for switching being a bistable switch and having at least first and second semiconductor switches connected in series with a zener diode and responsive to a level of voltage of said predetermined DC voltage.

30. Method for power line carrier controlled lighting system connected to an AC power line, comprising the steps of:

detecting at least one predetermined parameter in a detection zone by at least one means for detecting, said means for detecting outputting at least one detect signal in response to said at least one predetermined parameter;

transmitting during a first predetermined time period a power line carrier signal on the AC power line indicative of said at least one detect signal;

receiving said power line carrier signal on the AC power line with a means for receiving and providing at least one control signal indicative of the power line carrier signal during a second predetermined time period;

providing substantial noise immunity i said means for receiving so that said means for receiving reliably recognizes said power line carrier signal by acquiring signal current of the power line carrier signal during a signal integration window and identifying a presence of the power line carrier signal from the acquired signal current at an end of the signal integration window; and providing at least one means for providing light in a predetermined area, said at least one means for providing light having at least two different light intensity levels, said at least one means for providing light also having means for changing between said at least two light intensity levels, said means for changing being activated by said at least one control signal.

31. The method for power line carrier control according to claim 30, wherein said power line carrier signal is a digital signal having logical ones and zeros and wherein said step of providing substantial noise immunity is a step of determining a logical one/zero reference level.

32. The method for power line carrier control according to claim 31, wherein said power line carrier signal is substantially synchronized to zero crossings of an AC waveform on the AC power line.

33. The method for power line carrier control according to claim 32, wherein said power line carrier signal has; a sync burst portion having an AGC set up portion and a preamble portion, followed by a message portion having an address portion having a first predetermined number of address bits and a control portion having a second predetermined number of control bits.

34. Method for power line carrier controlled lighting system connected to an AC power line, comprising the steps of:

detecting at least one predetermined parameter in a detection zone by at least one means for detecting, said means for detecting outputting at least one detect signal in response to said at least one predetermined parameter;

transmitting during a first predetermined time period a power line carrier signal on the AC power line indicative of said at least one detect signal, said power line carrier signal being a digital signal having logical ones and zeros an substantially synchronized to zero crossings of an AC waveform on the AC power line;

receiving said power line carrier signal on the AC power line with a means for receiving and providing at least one control signal indicative of the power line carrier signal during a second predetermined time period;

providing substantial noise immunity in said means for receiving by determining a logical one/zero reference level so that said means for receiving reliably recognizes said power line carrier signal;

providing at least one means for providing light in a predetermined area, said at least one means for providing light having at least two different light intensity levels, said at least one means for providing light also having means for changing between said at least tow light intensity levels, said means for changing being activated by said at least one control signal; and for determining a logical one/zero reference level;

accumulating and storing signal current of the received power line carrier signal in a means for storing as a first voltage during each predetermined signal integration window of a plurality of signal integrating windows;

forming a recent average peak voltage form at least a plurality of first voltages during a respective plurality of one-half cycles of the AC waveform on the AC power line;

comparing said first voltage, at least at substantially the end of said signal integration window, to said recent average peak voltage;

substantially adding said first voltage to said recent average peak voltage when said comparison determines that said first voltage is greater than said average peak voltage at substantially the end of said signal integration window;

substantially zeroing said means for storing after the end of said signal integration window;

comparing said first voltage to a predetermined percentage of said recent average peak voltage at least at substantially the end of the predetermined signal integration window, and when said comparison determines that said first voltage is greater than said predetermined percentage of said average peak voltage, said means for receiving recognizes a logical one and, when said comparison determines that said first voltage is less than said predetermined percentage of said average peak voltage, said means for receiving recognizes a logical zero.

35. The method for power line carrier control according to claim 34, wherein said line carrier signal has a high frequency carrier which substantially continuously occurs during a half cycle of the AC waveform to represent a logical one, a logical zero being represented by an absence of said high frequency carrier, and a logical double mark being represented by two consecutive logical ones.

36. The method for power line carrier control according to claim 34, wherein said power line carrier signal has at least a sync burst portion having at least an AGC set up portion consisting of a plurality of logical double marks.

37. The method for power line carrier control according to claim 36, wherein said AGC portion consists of approximately 32 logical double marks.

38. The method for power line carrier control according to claim 37, wherein said sync burst has a preamble portion consisting of a logical double mark followed by a logical one, said preamble portion following said AGC set up portion.

39. The method for power line carrier control according to claim 34, wherein said predetermined signal integration window substantially begins at a zero crossing of the AC waveform on the AC power line and ends before the next zero crossing of the AC waveform.

40. The method for power line carrier control according to claim 39, wherein said predetermined signal integration window ends at substantially 1.38 milliseconds after a beginning of said predetermined signal integration window.

41. The method for power line carrier control according to claim 34, wherein said means for storing is substantially zeroed after approximately 50 milliseconds to 150 milliseconds when said first voltage is added to said recent average peak voltage at the end of said signal integration window.

42. The method for power line carrier control according to claim 30, wherein said method further has the step of initializing said at least one means for providing light at one of said light intensity levels for a predetermined warm up period during which said means for receiving does not acknowledge any power line carrier signal.

43. A method for controlling lighting in a warehouse having a plurality of aisles and at least one AC power line, comprising the steps of:

providing a series of lights above each of said aisles, at least one of said lights in each of said aisles having at least first and second light intensity levels;

providing at least one means for detecting movement in each of said aisles;

upon detecting movement in one aisle of said plurality of aisles providing a detect signal from a respective means for detecting associated with said one aisle;

transmitting during a first predetermined time period a power line carrier signal on the AC power line indicative of said detect signal;

receiving said power line carrier signal on the AC power line;

providing a control signal indicative of said received power line carrier signal to a predetermined light of said series of lights in said one aisle;

switching said predetermined light form one to another of said first and second light intensity levels in response to said control signal for a second predetermined time period, said first predetermined time period being less than said second predetermined time period;

switching said predetermined light back to an original light intensity level of said first and second light intensity levels unless another power line carrier signal is received before an end of said second predetermined time period, said another power line carrier signal being transmitted only if said respective means for detecting provides a detect signal at the end of said first predetermined time period.

44. The method for controlling lighting according to claim 43, wherein a plurality of means for detecting are provided above said plurality of aisles and wherein said means for detecting and said lights substantially form a matrix configuration.

45. The method for controlling lighting according to claim 43, wherein said lights are high intensity discharge lamps.

46. The method for controlling lighting according to claim 45, wherein said high intensity discharge lamps are switched from one to another of the first and second light intensity levels by connecting and disconnecting one capacitor in parallel with another capacitor in a switched capacitor circuit for operating the high intensity discharge lamp.

47. The method for controlling lighting according to claim 43, wherein said method further comprises the step of providing substantial noise immunity in a means for receiving said power line carrier signal so that said means for receiving reliably recognizes said power line carrier signal, said power line carrier signal being a digital signal having logical ones and zeros and said step of providing substantial noise immunity is a step of determining a logical one/zero reference level.

48. The method for controlling lighting according to claim 47, wherein said power line carrier signal is substantially synchronized to zero crossings of an AC waveform on the AC power line.

49. The method for controlling lighting according to claim 48, wherein said power line carrier signal has; a sync burst portion having an AGC set up portion and a preamble portion, followed by a message portion having an address portion having a first predetermined number of address bits and a control portion having a second predetermined number of control bits.

50. The method for controlling lighting according to claim 48, wherein the step of determining a logical one/zero reference level comprises the steps of:
  accumulating and storing signal current of the received power line carrier signal in a means for storing as a first voltage during each predetermined signal integration window of a plurality of signal integrating windows;
  forming a recent average peak voltage from at least a plurality of first voltages during a respective plurality of one-half cycles of an AC waveform on the AC power line;
  comparing said first voltage, at least at substantially the end of said signal integration window, to said recent average peak voltage;
  substantially adding said first voltage to said recent average peak voltage when said comparison determines that said first voltage is greater than said average peak voltage at substantially the end of said signal integration window;
  substantially zeroing said means for storing after the end of said signal integration window;
  comparing said first voltage to a predetermined percentage of said recent average peak voltage at least at substantially the end of the predetermined signal integration window, and when said comparison determines that said first voltage is greater than said predetermined percentage of said average peak voltage, said means for receiving recognizes a logical one and, when said comparison determines that said first voltage is less than said predetermined percentage of said average peak voltage, said means for receiving recognizes a logical zero.

51. The method for controlling lighting according to claim 50, wherein said power line carrier signal has a high frequency carrier which substantially continuously occurs during a half cycle of the AC waveform to represent a logical one, a logical zero being represented by an absence of said high frequency carrier, ad a logical double mark being represented by two consecutive logical ones.

52. The method for controlling lighting according to claim 50, wherein said power line carrier signal has at least a sync burst portion having at least an AGC set up portion consisting of a plurality of logical double marks.

53. The method for controlling lighting according to claim 52, wherein said AGC portion consists of approximately 32 logical double marks.

54. The method for controlling lighting according to claim 53, wherein said sync burst has a preamble portion consisting of a logical double mark followed by a logical one, said preamble portion following said AGC set up portion.

55. The method for controlling lighting according to claim 50, wherein said predetermined signal integration window substantially begins at a zero crossing of the AC waveform on the AC power line and ends before the next zero crossing of the AC waveform.

56. The method for controlling lighting according to claim 55, wherein said predetermined signal integration window ends at substantially 1.38 milliseconds after a beginning of said predetermined signal integration window.

57. The method for controlling lighting according to claim 50, wherein said means for storing is substantially zeroed after approximately 50 milliseconds to 150 milliseconds when said first voltage is added to said recent average peak voltage at the end of said signal integration window.

58. The method for controlling lighting according to claim 45, wherein said method further has the step of initializing at least one of said high intensity discharge lamps for a predetermined warm up period during which power line carrier signals on the AC power line are ignored.

59. A method for retrofitting lights and for controlling lighting in a warehouse having a plurality of aisles having a series of lights above each of said aisles, at least one of said lights in each of said aisles having at least first and second light intensity levels and said lights connected to at least one AC power line, comprising the steps of:
  providing at least one means for detecting movement in each of said aisles;
  upon detecting movement in one aisle of said plurality of aisles, providing a detect signal from a respective means for detecting associated with said one aisle;
  transmitting only once during a first predetermined time period a power line carrier signal only on the AC power line and indicative of said detect signal;
  providing at least one means for receiving said power line carrier signal for said at least one of said lights having said at least first and second light intensity levels;
  receiving said power line carrier signal on the AC power line with said at least one means for receiving;
  providing a control signal, indicative of said received power line carrier signal, form said at least one means for receiving to a predetermined light associated with said at least one means for receiving, said predetermined light being one of said series of lights in said one aisle;
  switching said predetermined light from one to another of said first and second light intensity levels in response to said predetermined time period being less than said second predetermined time period;
  switching said predetermined light back to an original light intensity level of said first and second light intensity levels unless another power line carrier signal is received before an end of said second predetermined time period, said another power line carrier signal being transmitted only if said respective means for detecting provides a detect signal at substantially the nd of said first predetermined time period;
  wherein only the AC power line is used for transmitting and receiving power line carrier signals, thereby avoiding adding any additional electrical wiring in the warehouse.

60. The method for controlling lighting according to claim 59, wherein a plurality of means for detecting are provided and wherein said method further comprises the step of providing a means for transmitting for each of said means for detecting, said means for transmitting being connected to said AC power line and being provided for transmitting a power line carrier signal having at least an address portion.

61. The method for controlling lighting according to claim 60, wherein a plurality of means for receiving are provided, wherein each of said means for receiving has a distinctive address, and wherein said method further comprises comparing in said means for receiving the address portion of a received power line carrier signal to the address in the means for receiving and providing a control signal only when said addresses are identical.

62. Power line carrier controlled lighting system connected to an AC power line, comprising:
- at least one means for detecting at least one predetermined parameter in a detection zone of said at least one means for detecting, said means for detecting outputting a detect signal in response to said at least one predetermined parameter;
- at least one means for transmitting during an initial first predetermined time period a power line carrier signal on the AC power line indicative of said detect signal, and for transmitting a further power line carrier signal on the AC power line during a further first predetermined time period only if said means for transmitting receives said detect signal during said further first predetermined time period;
- at least one means for receiving said power line carrier signal on the AC power line an outputting a control signal indicative of the power line carrier signal during an initial second predetermined time period, said means for receiving outputting said control signal during a further second predetermined time period only if said means for receiving receives a further power line carrie signal during said initial second predetermined time period, said initial first predetermined time period being less than said initial second predetermined time period and said further first predetermined time period being less than said further second predetermined time period;
- at least one means for providing light in a predetermined area and having at least two different light intensity levels, said means for providing light having means for changing between said at least two light intensity levels, said means for changing being activated by said control signal;
- said power line carrier signal being a digital signal having logical ones and zeros, and said power line carrier signal being substantially synchronized to zero crossings of an AC waveform on the AC power line, said means for receiving having a variable means for determining a logical one/zero reference level; and
- said means for determining a logical one/zero reference level having
- means for accumulating and storing signal current of the received power line carrier signal as a first voltage during each predetermined signal integration window of a plurality of signal integrating windows,
- means for forming a recent average peak voltage form at least a plurality of first voltages during a respective plurality of one-half cycles of the AC waveform on the AC power line,
- first means for comparing said first voltage, at least at substantially the end of said signal integration window, to said recent average peak voltage,
- means for substantially adding said first voltage to said recent average peak voltage when said first means for comparing determines that said first voltage is greater than said average peak voltage at substantially the end of said signal integration window,
- means for substantially zeroing said means for accumulating and storing after the end of said signal integration window, and
- second means for comparing said first voltage to a predetermined percentage of said recent average peak voltage at least at substantially the end of the predetermined signal integration window, and when said second means for comparing determines that said first voltage is greater than said predetermined percentage of said average peak voltage, said means for receiving recognizes a logical one and, when said second means for comparing determines that said first voltage is less than said predetermined percentage of said average peak voltage, said means for receiving recognizes a logical zero.

63. The power line carrier controlled lighting system according to claim 62, wherein said predetermined signal integration window substantially begins at a zero crossing of the AC waveform on the AC power line and ends before the next zero crossing of the AC waveform.

64. Power line carrier controlled lighting system connected to an AC power line, comprising:
- at least one means for detecting at least one predetermined parameter in a detection zone of said at least one means for detecting, said means for detecting outputting a detect signal in response to said at least one predetermined parameter;
- at least one means for transmitting during an initial first predetermined time period a power line carrie signal on the AC power line indicative of said detect signal, and for transmitting a further power line carrier signal on the AC power line during a further first predetermined time period only if said means for transmitting receives said detect signal during said further first predetermined time period;
- at least one means for receiving said power line carrier signal on the AC power line and outputting a control signal indicative of the power line carrier signal during an initial second predetermined time period, said means for receiving outputting said control signal during a further second predetermined time period only if said means for receiving receives a further power line carrier signal during said initial second predetermined time period, said initial first predetermined time period being less than said initial second predetermined time period and said further first predetermined time period being less than said further second predetermined time period;
- at least one means for providing light in a predetermined area and having at least two different light intensity levels, said means for providing light having means for changing between said at least two light intensity levels, said means for changing being activated by said control signal; and
- said at least one means for detecting having means for indicating at least these modes of operation, a first mode of operation being an OK status, a second mode of operation being a DETECT status and a third mode of operation being a TRANSMIT status, said means for indicating providing different first, second and third visual signals corresponding respectively to the first, second and third modes of operation.

* * * * *